428-408 SR

3/22/83 XR 4,377,618

United States Patent [19]

Ikeda et al.

[11] 4,377,618

[45] Mar. 22, 1983

[54] INFRARED RADIATOR

[75] Inventors: Masaki Ikeda, Hirakata; Atsushi Nishino, Neyagawa; Tadashi Suzuki, Katano, all of Japan

[73] Assignee: Matsushita Electric Industrial Company, Limited, Japan

[21] Appl. No.: 286,185

[22] Filed: Jul. 22, 1981

[30] Foreign Application Priority Data

Jul. 23, 1980 [JP] Japan ................................ 55-101627

Sep. 3, 1980 [JP] Japan ................................ 55-122615

[51] Int. Cl.³ ........................ B32B 5/16; B32B 15/02; B32B 15/04

[52] U.S. Cl. .................................... 428/323; 264/125; 428/325; 428/328; 428/329; 428/403; 428/408; 428/697; 428/698

[58] Field of Search ............... 428/323, 325, 328, 329, 428/331, 403, 404, 408, 469, 472, 697, 698; 264/125

[56] References Cited

U.S. PATENT DOCUMENTS

| | | | |
|---|---|---|---|
| 2,954,552 | 9/1960 | Halpern | 428/328 |
| 3,350,178 | 10/1967 | Miller | 428/328 |
| 3,769,770 | 11/1973 | Deschamps et al. | 428/403 |
| 3,856,709 | 12/1974 | Porta et al. | 428/329 |
| 4,168,344 | 9/1979 | Shapiro et al. | 428/328 |
| 4,273,822 | 6/1981 | Bube | 428/328 |
| 4,297,405 | 10/1981 | Kasahara et al. | 428/328 |

*Primary Examiner*—William J. Van Balen

*Attorney, Agent, or Firm*—Lowe, King, Price & Becker

[57] ABSTRACT

An infrared radiator is disclosed which comprises a molded mass of an infrared radiating material and a frit material both in the form of powders which are fusingly bonded together on molding with or without use of a metallic substrate. Alternatively, the infrared radiator comprises a metallic substrate, an enamel coated layer formed on the substrate and made of a first material, the layer being roughened to have a certain level of surface roughness, and an infrared radiating material deposited on the enamel coated layer.

11 Claims, 9 Drawing Figures

INFRARED RADIATOR

BACKGROUND OF THE INVENTION

1. Field of the Invention

This invention relates to infrared radiators capable of emitting heat rays in the range of infrared ray wavelengths by application of heat.

2. Description of the Prior Art

Infrared rays are more readily absorbed by materials to be heated as compared with visible light rays having wavelengths of 0.3 to 0.8 μm and activate the molecular movement of the materials with the attendant great effect of heat generation. Accordingly, the infrared rays have widely been used in the fields of heating and drying.

It is well known that the transmission of heat energy can be classified into three categories of conduction, convection and radiation.

Particular reference is now made to cooking devices. Cooking of food has conventionally been conducted by various manners including, for example, methods chiefly using direct thermal conduction in which food is roasted or broiled by direct flame such as from gases, petroleum or solid charcoal or done on heating plates such as a hot plate, and methods in which air such as in ovens is heated and the heat energy from the heated air is transmitted to cooking food, i.e. the heating mainly depends on convection.

Components constituting foods are comprised of water, proteins, starch, fats and the like, and these materials show absorption characteristics as shown in FIG. 1, i.e. they have great absorption factors or absorptivities in the range of infrared wavelengths, particularly in the range of far infrared wavelengths above 3 μm and have such properties as to absorb the infrared energies corresponding to the absorption factors of the individual constituents and convert them into heat. In order to more effectively heat foods, it is necessary to irradiate from outside a great deal of infrared rays having wavelengths corresponding to the absorptivities of the individual constituents of food.

By the irradiation of the infrared rays, the molecules of the constituents of a material to be heated are vibrated and self-heated, so that this radiation heating shows better heat and energy efficiencies than the conventional conduction and convection methods, with the attendant advantage that the energy can be saved.

In order to effectively heat cooking stuffs, the infrared heating is favorable as will be seen from the absorption characteristics of FIG. 1. To this end, there is needed a heating source for radiating the infrared rays of wavelengths corresponding to the wavelengths absorbed by the cooking stuff.

As regards heating, human body is constituted of water, proteins, fats and the like. Similarly to cooking stuffs, effective heating of human body is conveniently feasible by the infrared heating as is apparent from the absorption characteristics of human body shown in FIG. 2.

In general, the energy E radiated from body is represented according to the Stefan-Boltzman equation:

$$E=\epsilon\sigma T^4 \ldots \quad (1)$$

in which $\epsilon$ represents an emissivity, $\sigma$ represents a constant, and T represents an absolute temperature °K.

That is, the energy is determined by the temperature of body and the emissivity or radiation rate of material and thus it is possible to make an infrared radiation source by providing a material having high emissivity in the region of infrared wavelengths and heating it at a suitably high temperature.

It is known that materials exhibiting great values of $\epsilon$ of the equation (1) include ceramic materials. In fact, ceramic materials have conventionally been used as the infrared radiation source. That is, ceramic materials have been employed as radiator by depositing on substrate or by making sintered masses of ceramics by the following methods.

(a) Method in which ceramics are sintered at high temperatures to give ceramic sintered masses.

(b) Method in which ceramic layer is formed by flame spray coating.

(c) Method in which organic or inorganic binders are combined with ceramic materials and the mixture is applied and sintered.

Infrared radiators which are obtained by the method (a) using ceramic sintered masses are commercially available, for example, as Dschwamk burner employed in gas fittings. This is a system which includes a hot plate made of sintered ceramic having a multitude of fine through-holes made vertically of the plate surface, by which on combustion of gas beneath the hot plate, the flame passes through the fine through-holes whereupon the hot plate is heated thereby generating a great deal of infrared rays. However, this system has a number of disadvantages that the sintered ceramic mass is poor in mechanical impact strength and resistance to cold-to-hot heat cycle and also in productivity and economy, that the sintered ceramic mass is thick and large in weight, so that the heat capacity becomes great, leading to the slow rise of temperature at the initial stage of heating, and that because of the adiabatic property of the sintered ceramic mass, the surface temperature becomes low with a small radiation energy E of the equation (1). In other words, the sintered ceramic mass has a drawback that the radiation energy is small for the heating energy.

The spray coating method (b) is a method in which a metal surface is roughened such as by blasting and then ceramic materials are spray coated by the plasma or flame spray coating technique to form a spray coated layer or radiator layer. One of features of the ceramic radiator layer obtained by the spray coating technique resides in that the layer thickness is sufficient to be in the range of several tens μ to several hundreds μ and thus the heat capacity becomes so small that the ceramic layer is readily turned higher in surface temperature than the sintered ceramic mass system, with the attendant advantage that the radiation energy becomes great according to the equation (1). In this connection, however, the spray coated layer is formed by applying ceramic particles of high temperature on a metal substrate, so that the layer is substantially porous. Because of this porosity, the substrate is susceptible to an influence of corrosive environment and practical application of this type of radiator over a long time will cause the spray coated layer to be separated with a loss of the infrared radiating effect.

The method (c) using heat-resistant paints is as follows: Heat-resistant paints and infrared radiating materials are mixed together to give paints, which are then applied on a metal substrate and baked to form a film containing the infrared radiating material. However, with the arrangement mentioned above, the effective infrared rays emitted from the infrared radiating material is intercepted by the film. The reason for this is as follows: The main component constituting the heat-resistant paint is usually made of silicone resin, which shows a great absorptivity in the infrared wavelength range of 7 to 10 μm. Accordingly, infrared rays in a certain range of wavelengths emitted from the infrared radiating material are filtered and there cannot be obtained infrared rays in the range of wave lengths effective for cooking stuffs and human body, resulting in a loss of energy and giving an adverse influence on the cooking performance and heating effect.

SUMMARY OF THE INVENTION

It is an object of the present invention to provide an infrared radiator which have excellent resistances to heat and corrosion.

It is another object of the invention to provide an infrared radiator which shows an excellent infrared radiating effect.

It is a further object of the invention to provide an infrared radiator which is able to effectively radiate heat rays of infrared wavelengths by application of heat such as from gas, petroleum and electric heating sources.

It is a still further object of the invention to provide an infrared radiator which is particularly useful in cooking devices such as gas table heater, gas grill, gas oven, petroleum heater, electric oven, electric roaster and the like.

The above objects can be achieved by an infrared radiator comprising a body or mass made of an infrared radiating material and a frit material both in the form of powders which are fused together to form a continuous body. The body or mass is usually in the form of a plate, board, sheet or the like. In order to impart satisfactory mechanical strengths to the mass and ensure high efficiency of infrared radiation, the ratio by weight of the infrared radiating material to frit material is generally in the range of 0.2:1 to 9:1.

In a preferred aspect, the infrared radiator according to the invention comprises a metallic substrate, a dense, continuous enamel coated layer made of a frit and formed on said metallic substrate, and a powder of an infrared radiating material applied onto the surface of said enamel coated layer. The application of the powder is preferably conducted by plasma spray coating.

Figure 5:
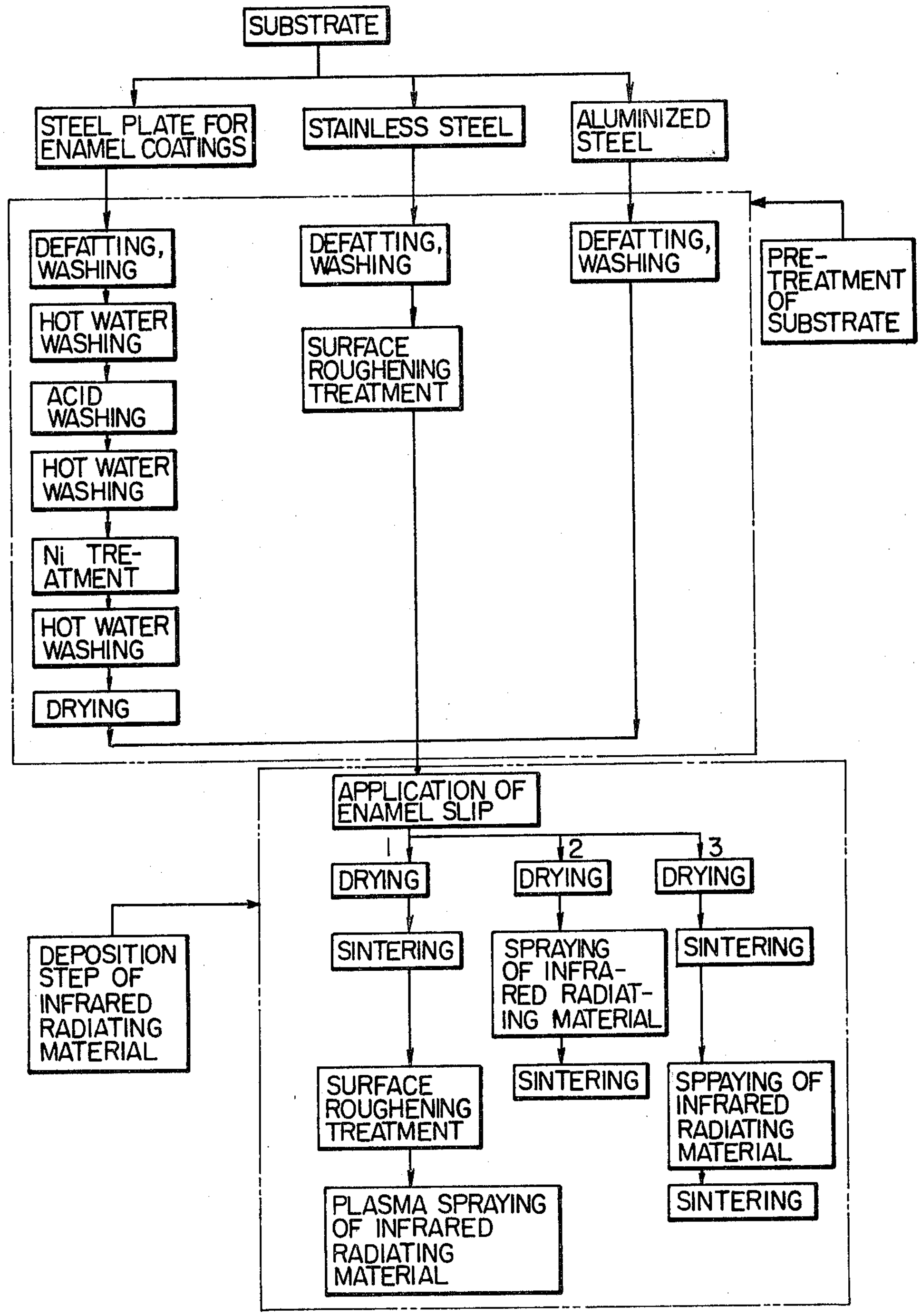

FIGS. *3a* and *3b* are schematic, sectional views of known infrared radiators;

FIGS. *4a* and *4b* are schematic sectional views of infrared radiators embodying the present invention;

FIG. 5 is a flow chart showing a process of making the infrared radiator according to the invention; and FIGS. *6a* and *6b* are schematic, sectional views of an infrared radiator using an enameled layer made of a material with great fusion flowability prior to and after a high temperature lifetime test, respectively.

DETAILED DESCRIPTION AND PREFERRED EMBODIMENTS OF THE INVENTION

Prior to discussing the arrangement according to the invention, prior-art infrared radiators which have been described hereinbefore in connection with the methods (b) and (c) are briefly described with reference to FIGS. *3a* and *3b*. In FIG. *3a*, there is shown an infrared radiator R which includes a metallic substrate 1 and ceramic particles 2 spray coated on the substrated 1 by the method (b) described hereinbefore. As having described, the spray coated layer of the ceramic particles inevitably involves pores P therein and thus the substrate is susceptily attacked by corrosive atmosphere in practical applications.

FIG. *3b* shows another bype of a known infrared radiator made by the method (c) described hereinbefore, which includes a metallic substrate 1 and a film 2 containing ceramic particles 3 therein. As is apparently seen from this figure, the ceramic particles are completely covered with the film 2 made of a heat-resistant resin such as silicone resin, leading to a poor efficiency of emitting infrared rays from the ceramic particles because of the covering with the resin.

(A) Arrangement of Infrared Radiator

Reference is now made to FIGS. *4a* and *4b* showing typical arrangements of infrared radiator according to the invention.

In FIG. *4a*, there is shown an infrared radiator R according to the invention which is made of a molded mass of an infrared radiating material 12 and a frit 14 both in the form of powders, these powders being fused together to form a dense, continuous body or mass. In order to impart to the mass mechanical and adhesion strengths sufficient to stand practical use and ensure high efficiency of infrared radiation, a ratio of the infrared radiating material to frit is in the range of 0.2:1 to 9:1. If required, a metallic substrate may be provided to support the molded mass. Further, it is preferable to make the size of powder in the range of 10 to 200μ for the infrared radiating material and in the range of 1 to 100μ for the frit. These powders are usually molded into a suitable shape, for example, by press molding under conditions of 100 to 1000 $kg/cm^2$ and 600° to 1000° C., which depend on the type of the starting powders.

In FIGS. *4b*, there is shown another embodiment of the invention which includes a metallic substrate 16, an enamel coated layer 18 formed on the metallic substrate 16 and made of a frit, and a powder 20 of an infrared radiating material applied on the surface of the enamel coated layer 18. In this arrangement, the metallic substrate is completely protected by the enameled layer, and becomes stable against corrosion even though the radiator is employed under conditions where cementation corrosive materials such as carbon, corrosive gases such as $SO_2$ or corrosive solution such as of NaCl is present.

(B) Infrared Radiating Materials

The infrared radiating materials to be used in the present invention are those capable of emitting infrared rays when heated and including, for example, metal oxides such as $Al_2O_3$, $TiO_2$, $SiO_2$, $ZrO_2$, MgO, CaO, $Cr_2O_3$, NiO, CoO and $MnO_2$, mixed oxides such as $Al_2O_3.TiO_2$, $2Al_2O_3.3SiO_2$, and $ZrO_2.CaO$, double oxides such as $MgAl_2O_4$, $MgZrO_3$ and $CaZrO_3$, carbides such as SiC, TiC, $Cr_3C_2$ and ZrC, and nitrides such as BN TiN, SiN and CrN. Further, carbonaceous materials such as graphite and nickel-coated graphite are effectively used. Preferably, $Al_2O_3$, $SiO_2$ and graphite are used in view of economy and infrared radiating performance.

(C) Bonding Method of Infrared Radiating Particles

The particulate mixture of the infrared radiating materials and frit can be bonded together by the following manners to give a mass as shown in FIG. *4a.*

(1) Methods in which the particulate mixture is dispersed in suitable medium to obtain a slip, and sintered.

(2) Method in which powders of an infrared radiating material and frit are mixed and sintered in a mold by hot press techniques.

The infrared radiator of this type should be formed under properly controlled temperature and time conditions since too high temperatures for baking or too long baking time even at suitable temperatures undesirably render the frit completely vitreous thereby covering the particles of infrared radiating material therewith. Accordingly, the infrared radiating effect is reduced so much. On the contrary, when the baking temperature and time are not sufficient, the mechanical strengths, resistance to abrasion and adhesion strengths of the radiator become weak. The baking temperature and time are determined in consideration of the softening temperature, particle size, size distribution and mixing ratio of the frit, and is generally in the ranges of 500° to 1000° C. and 0.1 to 0.5 hours, respectively.

Figure 4A:
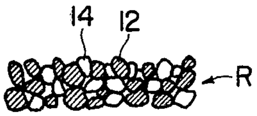
Figure 4B:
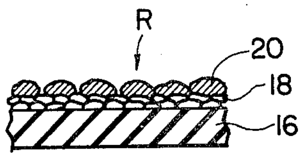
Figure 6A:
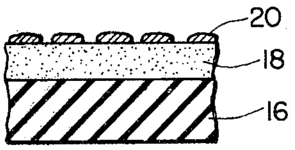
Figure 6B:
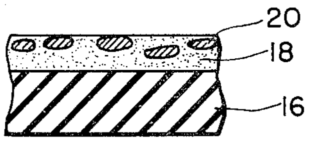

In the arrangement shown in FIG. 4*b,* the infrared radiating powder can be applied to the enameled layer by the following methods.

(1) Method of depositing powder of an infrared radiating material on the surface of enameled layer (Deposition Method 1).

(2) Method in which powder of an infrared radiating material is sprayed over a non-fused enamel coating layer and then sintered to bond the enameled layer and the infrared radiating powder together (Deposition Method 2).

(3) Method in which powder of an infrared radiating material is sprayed over an enameled layer and then again sintered to bond the enameled layer and the powder together (Deposition Method 3).

These deposition methods are particularly shown in FIG. 5 and are described in more detail in the following.

(D) Deposition Method 1

The deposition method 1 is a method in which powder of an infrared radiating material is deposited on the enamel coated layer by spray coating techniques.

(a) Metallic Substrate

The metallic substrate which is one of essential components of the arrangement of FIG. 4*b* is made, for example, of aluminium, aluminium casting alloys, castings, aluminized steel, low carbon steel, steel plates for enamel coatings, nickel-chromium steel, iron-chromium, nickel-chromium-aluminium steel, stainless steel and the like. Choice of these metals depends on the employing conditions and temperature, economy, shape of the substrate, and processability.

(b) Shape of Substrate

The substrate may be in any forms including flat boards with or without irregularities on the surface thereof, lath wire gauses, rolled lath wire gauses, punching metals, and coils.

(c) Enamel Coatings For Substrate (i) Pretreatment of Substrate

Prior to the enamel coatings, it is necessary to remove from metallic substrate oils applied for corrosion prevention during transportation or storage or in a molding step. This pretreatment gives a great influence on the adhesion strength of the enameled layer. As is clearly seen from FIG. 5, the pretreatment suitable for individual substrate materials should be preferably done.

(ii) Frits for Enamel Coatings

Depending on the type of substrate material, a frit composition should be suitably selected to have physical properties (coefficient of thermal expansion, softening temperature, etc.) and enamel-firing temperature suitable for the material in view of its coefficient of thermal expantion, melting point, and transformation temperature.

In Table 1, there are shown coefficients of thermal expansion of typical substrate materials and frits suitable for these substrate materials to be used in the present invention.

TABLE 1

| Substrate Material | | Frit |
|---|---|---|
| Type | Coefficient of Thermal Expansion | Coefficient of Thermal Expansion |
| aluminum | $235 \times 10^{-7}$ deg$^{-1}$ | 150–170 $\times 10^{-7}$ deg$^{-1}$ |
| aluminized steel | $124 \times 10^{-7}$ deg$^{-1}$ | 80–120 $\times 10^{-7}$ deg$^{-1}$ |
| steel plate suitable for enamel coatings | 108–120 $\times 10^{-7}$ deg$^{-1}$ | 80–105 $\times 10^{-7}$ deg$^{-1}$ |
| stainless steel (SUS430) | 108–120 $\times 10^{-7}$ deg$^{-1}$ | 80–100 $\times 10^{-7}$ deg$^{-1}$ |

In order to prevent the separation of the enamel coated layer due to the difference in coefficient of thermal expansion between the substrate material and enamel coated layer, it is necessary to select a frit having a coefficient of thermal expansion suitable for a selected substrate material.

(iii) Step of Preparing Enamel Slip

When the type of frit is determined, it is admixed, if necessary, with a mill additive, mat former, surface active agent and water in suitable amounts, followed by mixing such as in a ball mill to give a slurry (slip).

(iv) Coating, Drying and Sintering Steps

The thus prepared slip is usually applied by a spray or dip coating but a brush or bar coating may be used.

The drying is feasible by air drying or by the use of a drying oven of 50°–150° C. to dry the coated surface.

Then, the dried slip is sintered in a batch or continuous furnace set at a predetermined temperature ranging 500° to 900° C. which may vary depending on the type of frit.

(d) Roughness of Enamel Coated Surface

In general, where ceramics are spray coated on metal substrates, the adhesion strength established between the ceramic film and substrate mainly depends on the mechanical anchoring effect and thus it is necessary to make the metal surface rough, prior to the coating, by a surface treatment such as of blasting.

When ceramics are coated on metal substrates flame or other spraying techniques, it is general that, in view of the adhesion strength, the roughness of the metal surface should be over 4 μm as expressed by a surface center line average roughness Ra on measurement with the Talysurf surface roughness tester.

In contrast, when ceramics are coated on the enamel coated layer by plasma, flame or other spraying techniques in accordance with the present invention, the roughness of the enamel coated layer is sufficient to be above 1 μm as expressed by the center line average roughness Ra. The reason for this is that aside from the anchoring effect, fused particles of ceramic of high temperature are brought into collision with the enamel coated layer and, as a result, the layer is locally heated and converted into a semi-fused vitreous state thereby permitting the ceramic particles to chemically combine with the semi-fused layer and insuring high adhesion strength.

The relationship between the surface roughness Ra and adhesion strength was experimentally confirmed. These results are shown in Table 2 below. It will be noted that the adhesion strength was evaluated by a separating test using a gum adhesive tape, in which the mark "o" indicates a state where no separation of the spray coated layer is observed, the mark "Δ" indicates a state where partial separation is observed, and the mark "x" indicates a state of complete separation.

TABLE 2

| Surface Roughness Ra | 0.5μ | 0.8μ | 1.0μ | 2.8μ | 4.0μ | 6.2μ | 8.1μ | 12.5μ |
|---|---|---|---|---|---|---|---|---|
| Spray coating of ceramic on metal (Fe) | x | x | x | x | 0 | 0 | 0 | 0 |
| Spray coating of ceramic on enamel coated layer according to the invention | x | Δ | 0 | 0 | 0 | 0 | 0 | 0 |

From the above results, it will be appreciated that the surface roughness of the enameled layer according to the invention is effective in the range of over 1.0μ.

(e) Roughening Treatment of Enamel Coated Layer

The enamel coated layer can be roughened to have a desired level of roughness by the following procedures.

(1) Mechanical methods (sand blasting, rubbing with sand paper and the like).

(2) Chemical methods (etching treatment).

(3) Control by slip (particle size of slip, mill additive, amount and particle size of mat former, and sintering temperature and time are controlled).

Any of these methods are satisfactorily usable in the practice of the invention.

(f) Spray Coating Method

Several spray coating methods are known including an arc spray coating, a flame spray coating and the like. In order to attain the purpose of the invention, a plasma spray coating technique is preferable. The reason for this is due to the fact that the enamel coating material and spray coating powder should be chemically combined strongly and if such combination is not strong, it can not be stand use since heat cycle and employing conditions are very severe, i.e. the force of the combination attained by methods other than the plasma spray coating is weak. The plasma spray coating is preferably conducted in an atmosphere of argon gas, argon-hydrogen gas or argon-helium gas. Most preferably, the argon-helium gas is used. The coating conditions are preferably as follows: Secondary output conditions include a direct current of above 30 V and an electric current of above 600 A.

On judging these conditions from a viewpoint of lifetime, although the plasma spray coating is feasible under conditions of below 30 V and below 600 A, the lifetime of the spray coated layer obtained under these conditions becomes short on application under actual heat cycling and cooking conditions. It will be noted that the spray coated layer is generally formed in a thickness of 10 to 300μ.

(E) Deposition Methods 2 and 3 of Infrared Radiating Materials

The deposition method 2 is a method in which after application and drying of an enamel slip, an infrared radiating material is applied on and sintered to deposit the material.

The deposition method 3 is a method in which after an enameled layer has been once sintered, an infrared radiating material is applied on the layer surface and again sintered to deposit the material.

In these deposition methods 2 and 3, the pretreatment of substrate, enamel frit, and preparation, application and drying procedures of enamel slip are feasible in the same manner as in the deposition method 1.

The application of the infrared radiating material in these methods 2 and 3 can be conducted by various procedures including sprinkling of the powder of infrared radiating material, spraying the powder of infrared radiating material by spray gun, and mixing an infrared radiating material with a primary binder such as gelatin and then spraying the mixture. If the powder is used, its size is in the range of 1 to 200μ to to allow the powder to be deposited uniformly on the enameled layer.

Then, the applied material is sintered to give a chemical combination of part of the infrared radiating powder and the vitreous material of the enameled layer, thus ensuring strong adhesion strength.

(F) Flowability of Enameled Layer

On investigation of the infrared radiation performance and lifetime in relation to flowability of enamel glazes or frits, close relationships therebetween have been found, i.e. good results are obtained when the flowability of the enamel glaze is below 75 mm when determined by fusion flow.

The reason for this is as follows: When an enamel coated layer which shows great flowability is practically used over a long time, the infrared radiating material 20 which is formed on the enamel coated layer 18 as shown in FIG. *6a* is settled down into the enamel coated layer 18 as shown in FIG. *6b*, thus extremely lowering the infrared radiating performance.

That is, the radiator having an enamel coated layer 18 made of a frit or glaze showing small flowability exhibits no change in state when subjected to a high temperature lifetime test over a long time, but with the radiator having an enamel coated layer of great flowability, the infrared radiating material is sunk into the enamel coated layer when subjected to the lifetime test of high temperature. Accordingly, as described hereinabove, the infrared rays emitted from the material 20 are absorbed and intercepted by the layer 18, the radiating performance being extremely lowered.

The relationship between the flowability and infrared radiating performance was experimentally confirmed. These results are shown in Table 3 below. It will be noted that the infrared radiation performance after the lifetime test was evaluated as follows: A case where no change is observed as compared with an initial performance prior to the lifetime test was indicated by "o" and a case where the performance was deteriorated on comparison with the initial performance was indicated by "x".

The fusion flow was determined as follows: Glazes or frits for various ferro enamels used and 100 g of each glaze was allowed to stand on a substrate inclined at an angle of 45 degrees in an electric furnace of 800° C. for 1 minute, followed by measuring a distance of the flowed glaze along the inclined substrate.

TABLE 3

| Fusion Flow of Enamel Glaze (mm) | 32 | 48 | 61 | 75 | 83 | 91 | 97 |
|---|---|---|---|---|---|---|---|
| Infrared radiating Performance After Lifetime Test | 0 | 0 | 0 | 0 | x | x | x |

Accordingly, the fusion flow of the enamel glaze according to the invention is conveniently in the range of below 75 mm.

The present invention is particularly described by way of the following examples, which should not be construed as limiting the present invention.

EXAMPLE 1

In order to confirm the effect of the infrared radiators according to the invention, the following evaluation tests were conducted. In this example, the radiators were arranged as shown in FIGS. **4*a* and 4*b*. With the arrangement of FIG. 4*b***, the deposition method 1 was used.

Based on the respective arrangements, infrared radiators with a size of 60×180 mm were made and evaluated from different angles with the results shown in Table 4 below.

TABLE 4

Figure 1:
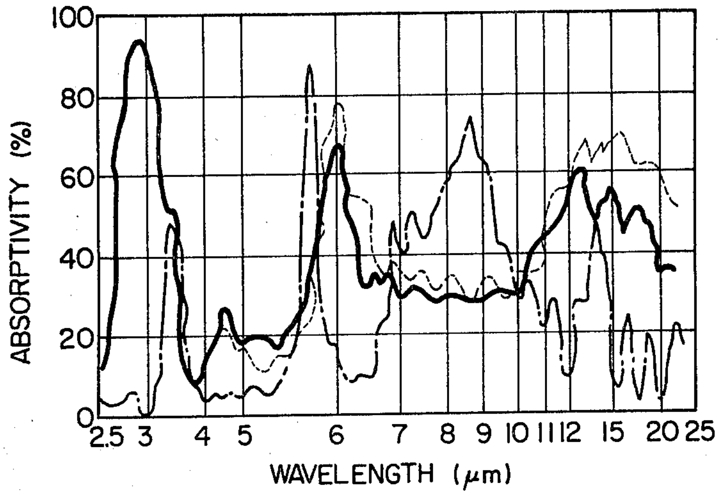
FIG. 1 is a graph showing a relationship between the wavelength and absorptivity of different food constituents.
Figure 2:
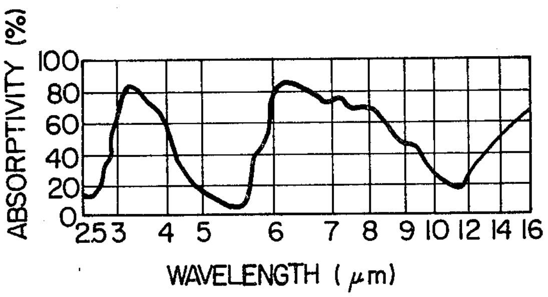
FIG. 2 is a graph showing a relationship between the wavelength and absorptivity for human body.
Figure 3A:
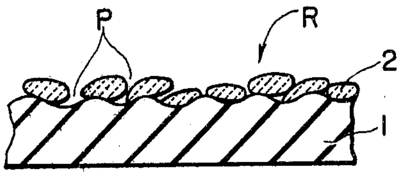

| | | A | | B | | C | D |
|---|---|---|---|---|---|---|---|
| | | Substrate | | Roughness of Enameled Substrate Surface | | | |
| Test No. | | Material | Enamel Coated Layer | Treatment | Surface Roughness Ra | Spray Coated Layer | Arrangement |
| Comparative Test | 1 | stainless steel (SUS430) | nil | blasting | 5μ | $Al_2O_3.TiO_2$ | FIG. 3a |
| | 2 | stainless steel (SUS430) | enamel for stainless steel | nil | 0.5μ | nil | — |
| | 3 | s.p.e. | ferro enamel | nil | 0.5μ | $Al_2O_3.TiO_2$ | — |
| Inventive Test | 4 | s.p.e. | ferro enamel | blasting | 5μ | $Al_2O_3.TiO_2$ | FIG. 4b |
| | 5 | " | ferro enamel | mat former added to enamel slip | 2.5μ | " | " |
| | 6 | " | ferro enamel | blasting | 5μ | $MgAl_2O_4$ | " |
| | 7 | " | ferro enamel | " | " | $2Al_2O_3.3SiO_2$ | " |
| | 8 | " | ferro enamel | " | " | SiC | " |
| | 9 | aluminized iron | enamel for aluminized iron | " | " | $Al_2O_3.TiO_2$ | " |
| | 10 | — | — | — | — | — | FIG. 4a |

| | E | F | | | G |
|---|---|---|---|---|---|
| | | Separability of Spray Coated Layer in Utility Tests | | | Cooking Performance (Broiling |
| Test No. | Heat Cycling Performance | Salt Corrosion | Cementation Corrosion | Sulfide Corrosion | Time for Two Mackerel) |
| 1 | 0 | x | 0 | 0 | 7-8 min. |
| 2 | 0 | 0 | 0 | 0 | 20 min. |
| 3 | x | 0 | 0 | 0 | 7-8 min. |
| 4 | 0 | 0 | 0 | 0 | " |
| 5 | 0 | 0 | 0 | 0 | " |
| 6 | 0 | 0 | 0 | 0 | " |
| 7 | 0 | 0 | 0 | 0 | " |
| 8 | 0 | 0 | 0 | 0 | " |
| 9 | 0 | 0 | 0 | 0 | " |

TABLE 4-continued

| | | | | | |
|---|---|---|---|---|---|
| 10 | 0 | — | — | — | " |

Indicated in column A are the material of substrate and type of the enamel coated layer, in column B are the surface center line average roughness Ra of the substrate surface and type of the surface roughning treatment, in column C is a powdered material for the spray coated layer, in column D is an arrangement of the infrared radiator, in column E is the heat cycling performance, in column F is the separability of the spray coated layer when practically tested on gas table grill, and in column G is the broiling time of two mackerel on gas table grill.

In Test Nos. 2, and 3–9, as dshown in FIG. 5, a pretreatment depending on the type of the substrate material was conducted, after which a commercially available enamel slip suitable for the substrate material was applied by a spray gun, dried and sintered in which the sintering temperature was 980° C. for stainless steel enamel, 820°–860° C. for ferro enamel, and 600°–680° C. for aluminized steel enamel.

In test Nos. 3, 4 and 6–9, prior to the plasma spray coating, the enamel coated layers were each defatted and washed with acetone and subjected to the sand blast treatment with an alumina abrasive to roughen the surface satisfactorily. In No. 5, 10 parts of silica powder was added to the commercially available enamel slip, followed by sintering and rendering the enameled surface irregular. The surface center line average roughness Ra of the enameled layer was measured by the use of the Taly roughness tester. Then, the plasma spray coating was conducted.

The spray coating was conducted using a plasma spray coating apparatus of an output power of 80 KW under conditions, though varying depending on the type of the powder, of a voltage of 20–100 V, an electric current of 400–1000 A and an atmosphere of argon and helium gas. The spray coating was conducted such that the thickness of the coated layer was in the range of 50–100$\mu$.

The sample of No. 10 is directed to an arrangement as shown in FIG. 4*a*. That is, 50 parts by weight of powder frit with a size of 10–50$\mu$ was added to 100 parts of $Al_2O_3$, followed by well mixing and molding in a hot press to have the same shape as those of Test Nos. 1–9. The hot pressing was conducted at a pressure of 3 $kg/cm^2$ and at a temperature of about 750° C.

As will be appreciated from the above, test No. 1 is directed to a known sample in which the infrared radiating material was spray coated on the metallic substrate, No. 2 directed to a sample in which the enamel coated layer alone was formed on the metallic substrate, No. 3 directed to a sample in which after formation of the enamel coated layer, the infrared radiating powder was spray coated on the relatively even surface, Nos. 4–9 directed to samples in which the respective infrared radiating powders were spray coated on the enameled layers which had been roughened on the surface thereof to certain extents, and No. 10 directed to a sample which was obtained by molding a mixture of the frit and infrared radiating material under heating conditions.

The individual samples were each set in a gas table grill as radiator to evaluate the heat cycling performance and separability of the infrared radiating layer in the utility test.

The heat cycling test was conducted as follows: The gas table was put on for 20 minutes and off for 15 minutes as one cycle and this cycle was repeated 1000 times, after which the state of the spray coated layer was observed.

The salt corrosion test was conducted as follows: After 20 minutes turning-on and turning-off of gas, the radiator was immersed in a 3% NaCl solution and then gas was turned on, which was taken as one cycle, and this cycle was repeated 50 times, after which the state of the infrared radiating layer was observed.

The cementation corrosion test was conducted as follows: Incomplete combustion such as red flame combustion was continued for 30 minutes and then stationary combustion was continued for further 30 minutes as one cycle, and the state of separation of the spray coated layer was observed after 500 cycles in total.

The sulfide corrosion test was conducted by mixing about 0.1% of $SO_2$ with city gas and continuously burning it for 200 hours, after which the state of the spray coated layer was observed.

The performance in column G was determined as follows: Two salted mackerel, each weighing 400–500 g, were broiled and the time before completion of the broiling was measured. The degree of the broiling was judged from the state of scorching on the surface of the fish and the degree of broiling.

As will be apparently seen from Table 4, with the No. 1 radiator in which the infrared radiating material was directly spray coated on the metallic substrate, the corrosive solution readily passes through the pores of the coated layer to have the substrate material corroded thereby causing separation of the spray coated layer.

The No. 2 radiator in which the enamel coated layer alone is formed on the metallic substrate is excellent in resistance to corrosion but shows very poor cooking performance.

The No. 3 radiator in which the spray coated layer is formed on a relatively even enamel coated layer shows a problem with respect to heat cycling performance.

On the other hand, the radiators of test Nos. 4–10 according to the invention in which the enameled substrates having surface roughnesses Ra of above 1$\mu$ are spray coated with infrared radiating ceramics are found to be excellent in heat cycling performance and resistance to corrosion and are not deteriorated in cooking performance.

EXAMPLE 2

In order to confirm the deposition methods 2 and 3 applied to the radiator arrangement of FIG. 4*b*, infrared radiators with a size of 60×180 mm were made similarly to Example 1 to evaluate them from various angles. The results are shown in Table 5.

TABLE 5

| | A | B | | C | D |
|---|---|---|---|---|---|
| Test | | Enamel Coated Layer | | Infrared Radiation | |
| No. | Substrate | type | fusion flow | Material | Arrangement |

TABLE 5-continued

Figure 3B:
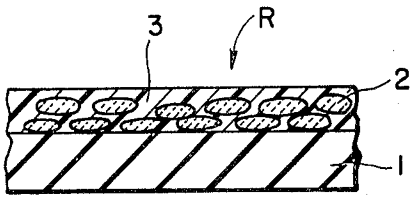

| | | | | | | |
|---|---|---|---|---|---|---|
| Comparative Test | 1 | SUS430 | — | — | $Al_2O_3$ spray coated | FIG. 3a |
| | 2 | " | — | — | $Al_2O_3$ and heat-resistant paint as binder | FIG. 3b |
| | 3 | SPE | ferro enamel | 91 mm | $Al_2O_3$ | FIG. 4b |
| Inventive Test | 4 | " | ferro enamel | 72 mm | " | " |
| | 5 | " | ferro enamel | 36 mm | " | " |
| | 6 | " | ferro enamel | " | $MgAl_2O_4$ | " |
| | 7 | " | ferro enamel | " | SiC | " |
| | 8 | stainless steel | enamel for stainless steel | 7 mm | $Al_2O_3$ | " |
| | 9 | aluminized steel plate | ferro enamel | 36 mm | $Al_2O_3$ | " |

| | E | | | | F | |
|---|---|---|---|---|---|---|
| | Evaluation in Utility Tests | | | | Cooking Performance (Broiling Time for Two Mackerel) | |
| Test No. | Heat Cycling Performance | Salt Corrosion | Cementation Corrosion | Sulfide Corrosion | Initial Performance | Performance After 100 Cycles |
| 1 | 0 | x | 0 | 0 | 7-8 min. | 7-8 min. |
| 2 | Δ | 0 | 0 | 0 | 20 min. | 20 min. |
| 3 | 0 | 0 | 0 | 0 | 7-8 min. | 20 min. |
| 4 | 0 | 0 | 0 | 0 | 7-8 min. | 7-8 min. |
| 5 | 0 | 0 | 0 | 0 | 7-8 min. | 7-8 min. |
| 6 | 0 | 0 | 0 | 0 | 7-8 min. | 7-8 min. |
| 7 | 0 | 0 | 0 | 0 | 7-8 min. | 7-8 min. |
| 8 | 0 | 0 | 0 | 0 | 7-8 min. | 7-8 min. |
| 9 | 0 | 0 | 0 | 0 | 7-8 min. | 7-8 min. |

The contents in the respective columns are similar to those of Example 1 except that the flowability and cooking performance after 100 heat cycles are added.

In this example, the test No. 1 is directed to a sample in which the ceramic is coated by plasma spray coating, No. 2 is a sample in which alumina is mixed with a silicone heat-resistant paint and applied by a spray gun, dried and sintered, Nos. 3-9 are samples in which after pretreatment suitable for the individual substrates as shown in FIG. 5, a commercially available enamel slip suitable for each substrate is applied by a spray gun, followed by sprinkling an infrared radiating material or powder such as $Al_2O_3$, $MgAl_2O_4$ or SiC over the enamel slip coated surface, drying and sintering. The sintering temperature is in the range of 820°-860° C. for ferro enamel and 980° C. for enamel for stainless steel.

That is, the samples of Nos. 1 and 2 are those formed by the conventional method, and Nos. 3-5 are samples in which the degree of flowability is changed, Nos. 6 and 7 are samples in which the type of infrared radiating material is changed, and Nos. 8 and 9 are samples in which the type of substrate is change.

It will be noted that the evaluation in utility tests shown in column E is conducted in the same manner as in Example 1.

In column F, the cooking performance was determined as follows: Two salted mackerel, each weighing 400-500 g, were broiled and the broiling time immediately after setting of the infrared radiator (initial performance) and the broiling time after 100 heat cycles (performance after the lifetime test) were measured, respectively.

As will be apparent from Table 5, with the known radiator of No. 1 in which the infrared radiating material is directly spray coated on the metallic substrate, the corrosive solution readily passes through the pores of the coated layer to have the substrate material corroded thereby causing the layer to separate.

The radiator of No. 2 in which a mixture of the heat-resistant paint and the infrared radiating material is formed on the metallic substrate exhibits an excellent resistance to corrosion but is considerably deteriorated in cooking performance because of the afore-mentioned filter effect.

The radiator of No. 3 reveals that when the enamel coated layer made of a material showing such a great fusion flowability presents a problem in the lifetime characteristic of the cooking performance.

As is apparent from the results of Nos. 4-9, the infrared radiators having the enamel coated layers showing fusion flows below 75 mm are found to show excellent heat cycling performance and resistance to corrosion with their cooking performance being not deteriorated.

In this example, the radiators have been described with reference to the gas table grill but may be applied to electric appliances such as electric ovens where radiators are electrically heated.

EXAMPLE 3

Heating elements of iron-chromium-aluminium alloy (JIS-FCH-2) were each washed on the surface thereof and pretreated in the manner as shown in FIG. 5, followed by treating in the same manner as in test No. 5 of Table 5. These samples were set in electric ovens and electric stoves to evaluate cooking and heating performances and durability. As a result it was found that these radiators were excellent in durability, cooking and heating performances similarly to Example 2.

As will be apparent from the foregoing, there can be obtained according to the invention an infrared radiator which exhibits excellent infrared radiating efficiency, lifetime against corrosion, and stability, and thus its industrial value is great.

What is claimed is:

1. An infrared radiator comprising a molded mass of an infrared radiating material and a frit material both in the form of powders in a mixing ratio by weight of 0.2:1 to 9:1, the powders being fusingly bonded together.

2. An infrared radiator according to claim 1, wherein said infrared radiating material is at least one member selected from the group consisting of metal oxides and mixture thereof, double oxides, carbides and nitrides.

3. An infrared radiator according to claim 1, wherein said infrared radiating material is graphite or nickel-coated graphite.

4. An infrared radiator according to claim 1, wherein the size of the powder is in the range of 10 to 200 microns for said infrared radiating material and in the range of 1 to 100 for said frit material.

5. An infrared radiator according to claim 1, further comprising a metallic substrate to support said molded mass.

6. An infrared radiator for cooking and heating devices comprising a metallic substrate, an enamel coated layer formed on said metallic substrate, having a surface center line average roughness Ra of above 1$\mu$ and made of a frit material showing a fusion flow of below 75 mm, and a infrared radiating material deposited on the surface of said enamel coated layer.

7. An infrared radiator according to claim 6, wherein said infrared radiating material is at least one member taken from the group consisting of metal oxides and mixtures thereof, double oxides, carbides and nitrides.

8. An infrared radiator according to claim 6, wherein said infrared radiating material is graphite or nickel-coated graphite.

9. An infrared radiator according to claim 6, wherein said infrared radiating material is used in the form of a powder and is plasma sprayed over the surface of said enamel coated layer.

10. An infrared radiator according to claim 6, wherein said infrared radiating material is applied on a non-fused enamel layer and then sintered to deposit said infrared radiating material on the layer.

11. An infrared radiator according to claim 6, wherein said infrared radiating material is applied over the enamel coated layer which has been sintered, and then sintered to deposit said infrared radiating material on said enamel coated layer.

* * * * *